Patented May 12, 1936

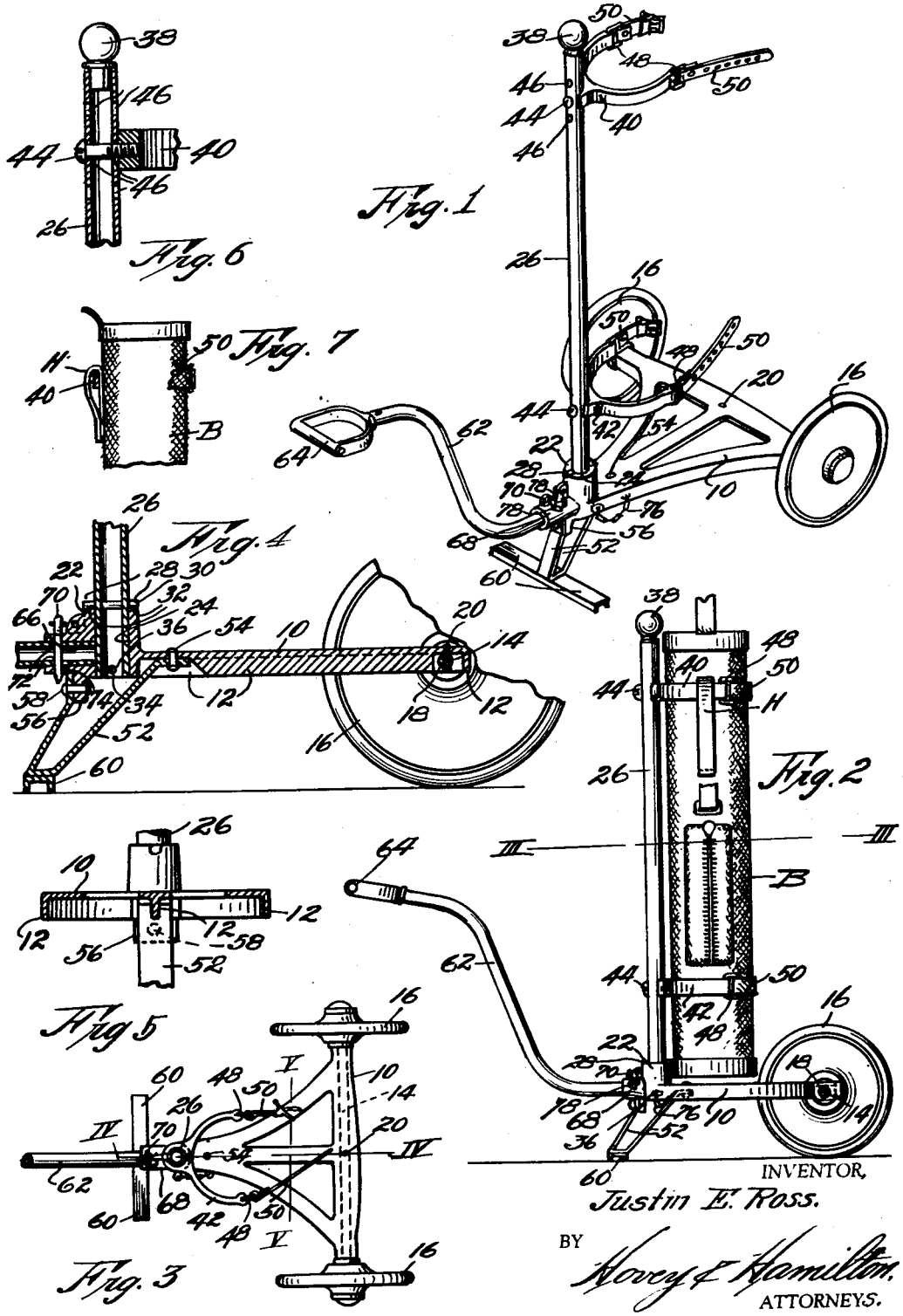

2,040,339

UNITED STATES PATENT OFFICE 2,040,339

GOLF BAG CART

Justin E. Ross, Kansas City, Mo.

Application March 4, 1935, Serial No. 9,250

5 Claims. (Cl. 280—53)

This invention relates to a vehicle for carrying golf bags, with the usual collection of clubs, balls, etc. during the playing of the golf game and has for its principal object, the provision of a pull cart whereby the golf bag is suspended in an upright position.

A further object of the present invention is the provision of a golf bag carrying cart which is so constructed as to be easily and quickly disassembled to more conveniently carry it in an automobile.

Another object of this invention is the provision of a golf bag carrying cart having a detachable standard adapted to engage and carry the golf bag in a suspended position.

Other objects are simplicity and economy of construction, efficiency and ease of operation, and convenience of transportation.

With these and other objects in mind, reference will now be had to the drawing, wherein:

Figure 1 is a perspective view of a golf bag carrying cart embodying the preferred form of this invention.

Fig. 2 is a side elevation of the same, with the golf bag in position.

Fig. 3 is a fragmentary, sectional, plan view, taken on line III—III of Fig. 2.

Fig. 4 is an enlarged, fragmentary, longitudinal, sectional view taken on line IV—IV of Fig. 3.

Fig. 5 is an enlarged cross sectional view taken on line V—V of Fig. 3.

Fig. 6 is an enlarged, sectional view of the upper end portion of the standard, showing the attachment of the bracket.

Fig. 7 is a fragmentary, broken elevation of the upper end of the golf bag and its connection with the standard bracket.

In the drawing, the numeral 10 designates a cart frame, made of a suitable light, yet sturdy, construction. The construction shown is a ribbed cast frame of web-like construction having a substantially planar upper surface and depending ribs 12, this producing a strong, yet light weight frame. For further reduction of the weight the frame could be made of formed sheet metal and could also be greatly varied in form without departing from the spirit of the invention.

A transversely disposed axle 14 positioned at the rear portion of the frame serves to carry suitable rollers or wheels 16. Axle 14 at its outer portion fits snugly through holes 18 formed through the frame 10 and is secured against longitudinal movement to the underside of the frame by rivet 20. The wheels 16 may be provided with any suitable journals, ball bearings, roller bearings, etc. which will determine to some degree the ease of operation.

At the forward portion of the frame a vertically disposed boss 22 extends above the surface of the frame, and has a cylindrical hole 24 formed therethrough to receive a hollow standard 26. Referring to Fig. 4, it will be noted that this boss also extends to the lower portion of the frame, thus making possible a relatively long bearing hole 24 for the standard which is positioned substantially perpendicular to the plane of the frame, and is adapted to maintain a substantially vertical position when the cart is at rest. The lower portion of the standard is provided with diametrically disposed lugs 28 formed by rigidly mounting a pin 30 in the standard with its ends projecting. These lugs are adapted to rest in notches or grooves 32 when the standard is in the operative position.

The lower portion of the standard is perforated at 34 to receive a key or pin 36 which passes through openings formed through the frame to hold the standard in position in the socket. To prevent to a large degree the rocking movement of the standard relative to the frame, it will be observed that pin 30 and key 36 are disposed at right angles to each other. Standard 26 is substantially the length of the ordinary golf bag and is capped at its top with a suitable member 38. Spaced-apart brackets 40 and 42 are positioned respectively adjacent the top and bottom of said standard and are removably secured thereto by means of screws 44 which pass through the standard and are threaded into the brackets. Bracket 42 which remains stationary on the post might be riveted or otherwise securely attached to the standard, however, bracket 40 necessarily needs to be adjustable longitudinally of the standard to accommodate golf bags of different lengths. For adjusting 40, a series of spaced holes 46 are formed through 26 to receive screw 44 as shown in Figs. 1 and 6.

Brackets 40 and 42 are of open, arcuate form and are positioned in alignment at the rear side of the standard so as to support the golf bag over the frame intermediate the standard and the wheel supports. Opposite ends of brackets 40 and 42 are provided with links 48 to which are attached straps 50. One strap on each bracket is provided with a buckle while the other strap is provided with perforations to receive the tongue of the buckle.

Referring now to Fig. 2, in which the golf bag B is shown in the operative position on the cart. It will be observed that the bag is encircled at its top portions by bracket 40 and its associated straps 50, and at its bottom portion by bracket 42 and its straps 50. All golf bags are provided with a hand hold H which is adapted to be slipped over the arm of bracket 40 as shown in Figs. 2 and 7.

When so positioned, it is apparent that the bag will be held in a fixed position relative to the standard and that the weight of the bag and its contained equipment will be carried by bracket 40. This method of carrying the load might be varied by permitting any desired portion of the weight to be carried directly by the frame, or most of the weight could be carried directly on the frame, and the standard serving only to maintain the bag in an upright position.

The forward portion of the frame is supported by a suitable strap metal leg 52 secured to frame 10 at 54 intermediate boss 22 and the rear portion thereof, and to a depending lug 56 by means of rivet 58. This leg extends downwardly and forwardly to a point in advance of the standard 26 and is provided with a transversely disposed foot member 60 made of a channel member riveted, welded or otherwise securely attached to leg 52. Said foot member being of a length sufficient to prevent accidental overturning of the cart.

A handle or tongue 62 having a hand grip 64 is adapted to be inserted into the horizontally disposed opening 66 which is formed through boss 68 positioned at the forward end of frame 10. A cotter pin or key 70 is adapted to pass vertically through openings 72 formed in boss 68 and through holes 74 formed through tongue 62 to maintain the tongue in the operative position. Pins 36 and 70 are secured to frame 10 by means of attaching chains 76 and 78 respectively.

Referring to Fig. 2, it will be noted that when the cart is in normal position it will rest on wheels 16 and foot 60 with the frame in a substantially horizontal position and with the golf bag supported within and above the area included between said wheels and foot.

The tongue hand grip of the cart is positioned at such a distance above the ground that it will require the operator to reach down slightly to grasp the same and when he again raises to a normal position, the foot 60 will be raised a sufficient distance from the turf to permit the cart to be pulled to the next green. When the cart is raised at its front portion as just described, the center of gravity of the loaded bag will be moved rearwardly a certain degree, thus removing a certain portion of the load from the handle to the wheels.

It is apparent that this golf bag carrying cart will serve to transport the golfer's equipment from one green to another and will serve to support the bag with its contents in an upright and convenient position at the greens.

While the preferred embodiment of the invention has been described, yet many alterations in construction might be made without departing from the scope of the appended claims.

What I claim is:

1. A golf bag cart comprising a frame having a recess provided in one end thereof; carrying wheels for the rear portion of said frame; an elongated, transversely disposed supporting foot at the front portion of said frame; a detachably mounted bag supporting standard carried by said frame, adapted to support a golf bag intermediate said foot and wheels; a forwardly and upwardly extending tongue removably secured in said recess; and an easily removable pin extending through the frame and end of said tongue extending into said recess.

2. A golf bag cart having a frame mounted on wheels and having a supporting foot forward of the axis of said wheels; a boss formed on said frame, having a vertically disposed hole formed therethrough, and having diametrically opposed grooves at its upper portion adjacent said hole; a standard having lugs adjacent its lower portion adapted to rest in said grooves as the lower end of said standard is positioned in said hole; and a securing pin passing through said standard and boss at right angles to the axis of said lugs.

3. A golf bag cart comprising a frame having a hollow vertically disposed boss and a hollow, horizontally disposed boss at its front portion; carrying wheels at the rear portion of said frame; a transversely disposed supporting foot for said frame positioned forward of said bosses; a hollow, vertically disposed golf bag supporting standard removably carried by said frame in said vertical boss; and a tongue removably carried in said horizontally disposed boss.

4. A golf bag cart comprising a frame having axially aligned wheels at its rear portion and a rigidly attached transverse foot support at its front portion; means attached to said frame for raising said foot above the ground and pulling said cart; a hole provided in the frame intermediate the wheels and support; a vertically disposed standard demountably carried by said frame with one end thereof extended into said hole; a golf bag engaging means longitudinally adjustable along said standard; and means for precluding turning of said standard about its axis whereby the said golf bag engaging means are maintained in overhanging relation with said frame.

5. A golf bag cart comprising a frame having intersecting openings provided therein at the front thereof, axially aligned wheels at its rear portion, and a rigidly attached transverse foot support at its front portion; means extending into one of said openings of said frame for raising said foot above the ground and pulling said cart; a vertically disposed standard demountably extending into the other opening of said frame; and a golf bag engaging means carried adjacent each end of said standard to secure said bag to said standard.

JUSTIN E. ROSS.